United States Patent [19]

Agarwal et al.

[11] Patent Number: 5,530,958
[45] Date of Patent: Jun. 25, 1996

[54] CACHE MEMORY SYSTEM AND METHOD WITH MULTIPLE HASHING FUNCTIONS AND HASH CONTROL STORAGE

[75] Inventors: Anant Agarwal, Framingham, Mass.; Steven D. Pudar, Rancho Cordova, Calif.

[73] Assignee: Massachusetts Institute of Technology, Cambridge, Mass.

[21] Appl. No.: 363,542

[22] Filed: Dec. 23, 1994

Related U.S. Application Data

[63] Continuation of Ser. No. 926,613, Aug. 7, 1992, abandoned.
[51] Int. Cl.$^6$ .............................. G06F 12/10; G06F 12/08
[52] U.S. Cl. .................... 395/403; 395/421.06; 395/435; 395/460; 364/DIG. 1; 364/243.41; 364/244.7; 364/255.8; 364/259.8
[58] Field of Search ............................. 395/421.06, 403, 395/435, 460

[56] References Cited

U.S. PATENT DOCUMENTS 5,235,697   8/1993   Steely, Jr. et al. ...................... 395/425

FOREIGN PATENT DOCUMENTS 2154106   5/1972   Germany .

OTHER PUBLICATIONS

Agarwal, "Analysis of Cache Performance for Operating Systems and Multiprogramming," Technical Report No. CSL-TR-87-332, Computer Systems Laboratory, Stanford University (May 1987).

Jouppi, "Improving Direct–Mapped Cache Performance by the Addition of a Small Fully–Associative Cache and Prefetch Buffers," Proc. of the IEEE (1990).

Agarwal, Anant, "Analysis of Cache Performance for Operating Systems and Multiprogramming, " Kluwer Academic Publishers, Boston, MA, Title page, Contents pp. vi–ix, pp. 120–124, see p. 122, line 14–p. 124, line 2.

Kessler, et al., "Inexpensive Implementations of Set–Associativity," *Computer Architecture News* 17(3): 131–139 (Jun. 1989).

da Silva, et al., "Pseudo–associative Store with Hardware Hashing," *IEE Proceedings E. Computers & Digital Techniques* 130(1): 19–24 (Jan. 1983).

Anant Agarwal and Steven D. Pudar, "Column–Associative Caches: A Technique for Reducing the Miss Rate of Direct–Mapped Caches." In *Proceeding ISCA* 1993 (Abstract).

Anant Agarwal et al., "Cache Performance of Operating System and Multiprogramming Workloads," *ACM Transactions on Computer Systems*, 6(4): 393–431, Nov., 1988.

Anant Agarwal et al., "An Analytical Cache Model," *ACM Transactions on Computer Systems*, 7(2): 184–215, May, 1989.

Kimming So and Rudolph N. Rechtschaffen, "Cache Operations by MRU Change," (Research Report #RC11613 (#51667) Computer Science, pp. 1–19, (Nov. 13, 1985). Yorktown Heights, NY: IBM T. J. Watson Research Center.

"A High Performance Memory Management Scheme"; Thakkar, Shreekant S. and Knowles, Alan E.; Computer; May 1986; IEEE Computer Society; pp. 8–20.

*Primary Examiner*—Eddie P. Chan
*Assistant Examiner*—Reginald G. Bragdon
*Attorney, Agent, or Firm*—Hamilton, Brook, Smith & Reynolds

[57] ABSTRACT

A column-associative cache that reduces conflict misses, increases the hit rate and maintains a minimum hit access time. The column-associative cache indexes data from a main memory into a plurality of cache lines according to a tag and index field through hash and rehash functions. The cache lines represent a column of sets. Each cache line contains a rehash block indicating whether the set is a rehash location. To increase the performance of the column-associative cache, a content addressable memory (CAM) is used to predict future conflict misses.

25 Claims, 7 Drawing Sheets

CACHE MEMORY SYSTEM AND METHOD WITH MULTIPLE HASHING FUNCTIONS AND HASH CONTROL STORAGE

This application is a continuation of No. 07/926,613 filed Aug. 7, 1992, now abandoned.

BACKGROUND OF THE INVENTION

This invention relates generally to the field of high performance processors that require a large bandwidth to communicate with a main memory system. To effectively increase the memory bandwidth, a cache memory system is typically placed between the processor and the main memory. The cache memory system stores frequently used instructions and data in order to provide fast access from the main memory.

In order for a processor to access memory, it checks the cache first. If the desired data is in the cache, a cache hit occurs, and the processor receives the data without further delay. If the data is not in the cache, a cache miss occurs, and the data must be retrieved from the main memory to be stored in the cache for future use. Main memory accesses take longer than cache accesses, so the processor is stalled in a cache miss, wasting a number of cycles. Thus, the goal for nearly all modern computer systems is to service all memory references from the cache and to minimize references which require accesses from the main memory.

In a typical cache system, a portion of a main memory address is used to index a location or a set of locations in cache memory. In addition to storing a block (or line) of data at that indexed location, cache memory stores one or more tags, taken from another portion of the main memory address, which identify the location in main memory from which the block of data held in cache was taken.

Caches are typically characterized by their size (i.e., amount of memory available for storage), their replacement algorithm (i.e., method of inserting and discarding blocks of data into a set), their degree of associativity or set size (i.e., number of tags associated with an index and thus the number of cache locations where data may be located), and their block or line size (i.e., number of data words associated with a tag). These characteristics influence many performance parameters such as the amount of silicon required to implement the cache, the cache access time, and the cache miss rate.

One type of a cache that is frequently used with modern processors is a direct-mapped cache. In a direct-mapped cache, each set contains only one data block and tag. Thus, only one address comparison is needed to determine whether the requested data is in the cache. The direct-mapped cache is simple, easy to design, and requires less chip area. However, the direct-mapped cache is not without drawbacks. Because the direct-mapped cache allows only one data block to reside in the cache set, its miss rate tends to be very high. However, the higher miss rate of the direct-mapped cache is mitigated by a small hit access time.

Another type of a cache that is frequently used is a d-way, set associative cache. A d-way, set associative cache contains S sets of d distinct blocks of data that are accessed by addresses with common index fields that have different tag fields. For each cache index, there are several block locations allowed, one in each set. Thus, a block of data arriving from the main memory can go into a particular block location of any set. The d-way set associative cache has a higher hit rate than the direct-mapped cache. However, its hit access time is also higher because an associative search is required during each reference, followed by a multiplexing of the data block to the processor.

Currently, the trend among computer designers is to use direct-mapped caches rather than d-way set associative caches. However, as mentioned previously, a major problem associated with direct-mapped caches is the large number of misses that occur. One particular type of miss that occurs is a conflict miss. A conflict miss occurs when two addresses map into the same cache set. This situation occurs when the addresses have identical index fields but different tags. Therefore, the addresses reference the same set. A d-way set associative cache typically does not suffer from conflict misses because the data can co-reside in a set. Although other types of misses, such as compulsory (misses that occur when loading a working set into a cache) and capacity (misses that occur when the cache is full and when the working set is larger than the cache size) do occur, they tend to be minimal as compared to conflict misses.

The problem of conflict misses has caused designers to reconsider using a direct-mapped cache and to begin designing cache memory systems that can incorporate the advantages of both the direct-mapped cache and the d-way associative cache. One approach has been to use a victim cache. A victim cache is a small, fully associative cache that provides some extra cache lines for data removed from the direct-mapped cache due to misses. Thus, for a reference stream of conflicting addresses $a_i, a_j, a_i, a_j, \ldots$, the second reference $a_j$ misses and forces the data i indexed by $a_i$ out of the set. The data i that is forced out is placed in the victim cache. Thus, the third reference address, $a_i$, does not require accessing main memory because the data is in the victim cache and can be accessed therefrom.

However, there are several drawbacks to the victim cache. For example, the victim cache must be very large to attain adequate performance because it must store all conflicting data blocks. Another problem with the victim cache is that it requires at least two access times to fetch a conflicting datum (i.e., one to check the primary cache, the second to check the victim cache, and maybe a possible third to store the datum in the primary cache). Still another drawback to the victim cache is that performance is degraded as the size of the cache memory is increased because the victim cache becomes smaller relative to the cache memory, thereby reducing the probability of resolving conflicts.

Consequently, there is a need for an improved cache memory system that incorporates the low conflict miss rate of the d-way set-associative cache, maintains the critical access path of the direct-mapped cache, and has better performance than the victim cache.

SUMMARY OF THE INVENTION

To provide a cache memory system with a high hit rate and a low hit access time, the present invention has set forth a column associative cache that uses an area-efficient cache control algorithm. A column associative cache removes substantially more conflict misses introduced by a direct-mapped access for small caches and virtually all of those misses for large caches. Also, there is a substantial improvement in the hit access time.

In accordance with the present invention, there is a cache memory having a plurality of cache sets representing a column of sets for storing data. Each cache set is indexed by memory addresses having a tag field and an index field. A controller indexes memory addresses to the cache data memory by applying at least one hashing function. A hashing function is an operation that maps the addresses of the data from a main memory to the cache sets of the cache data memory. A rehashed location stores data that is referenced by an alternate hashing function. The use of alternative hash functions (i.e., hash and rehash) allows cache sets associated with a common index to be stored within the single cache column rather than in separate columns, each of which requires its own memory space. For example, in a direct-mapped cache, the two hash functions allow two blocks with the same index to reside in different cache locations. In accordance with the present invention, hash control data is stored in the cache memory to direct the cache system to a hashed location or a rehashed location based on past cache operations. The hash control data may be a hash/rehash block associated with each cache location which indicates whether the hash or rehash function was used to store the data in that location. Alternatively, or in combination with the hash/rehash block, a memory may identify recent cache indexes or groups of indexes which have required rehash.

The cache memory system of the present invention resolves conflict misses that arise in direct-mapped cache access by allowing conflicting addresses to dynamically choose alternate hashing functions, so that most conflicting data can reside in the cache. In the cache memory system of the present invention, data is accessed from the cache by applying a first hashing function to the indexed memory address. If the data is valid, it is a hit and is subsequently retrieved. For a miss at a rehashed location, as indicated by a rehash block, the controller removes that data and replaces it with new data from the main memory. If the cache location is not a rehashed location, then a second hashing function is applied in order to place or locate the data in a different location. With a second miss, valid data is accessed and the controller swaps the data in the cache locations indexed by the first and second hashing functions.

The preferred first type of hashing function used by the present invention is a bit selection operation. The bit selection operation indexes the data in the cache lines according to the index field. If there is a conflict miss, then the second hashing function is applied. The preferred second hashing function of the present invention is a bit flipping operation. The bit flipping operation inverts the highest order bit of the index field of the address and accesses the data in that particular location. The present invention is not limited to two hashing functions and may use more.

In another preferred embodiment of the present invention, there is provided a content addressable memory (CAM) coupled to the cache memory system for storing portions of addresses that are expected to indicate future conflict misses in the cache. The CAM, preferably a tag memory, improves the efficiency of the cache by increasing the first time hit rate. The CAM stores the indexes of cache blocks that are present in rehashed locations. If the index of an address matches an index stored in the CAM, then the cache controller uses the rehash function (instead of the hash function) for the first time access. Thus, second time accesses are reduced.

While the present invention will hereinafter be described in connection with a preferred embodiment and method of use, it will be understood that it is not intended to limit the invention to this embodiment. Instead, it is intended to cover all alternatives, modifications, and equivalents as may be included in the spirit and scope of the present invention as defined by the appended claims.

DETAILED DESCRIPTION OF THE INVENTION

Figure 1:
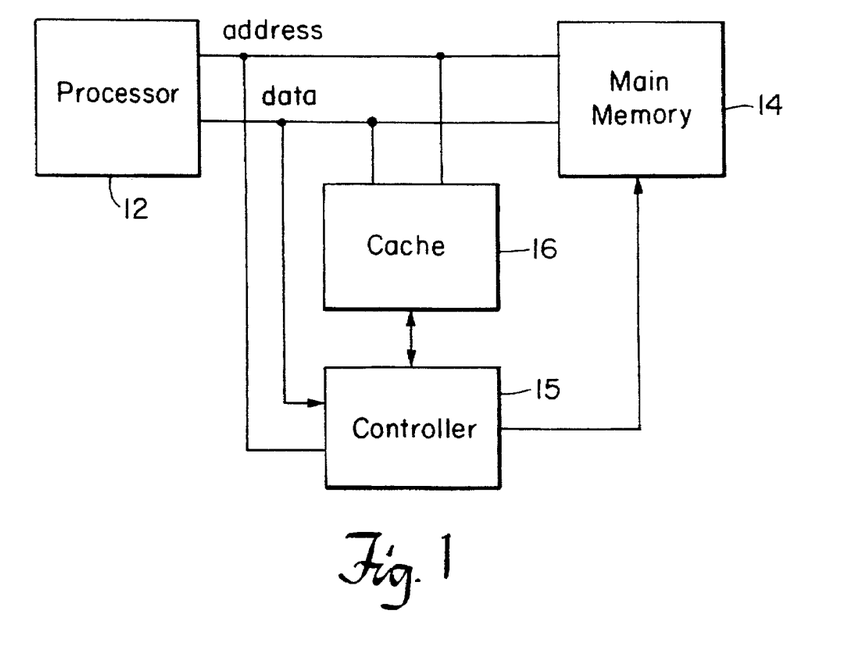
FIG. 1 shows a block diagram of a cache memory system of the present invention.

Referring to FIG. 1 of the present invention, there is shown a cache memory system 10 placed between a processor 12 and a main memory 14. The speed of the cache is compatible with the processor, whereas the main memory is lower in speed. The cache anticipates the processor's likely use of data in the main memory based on previously used instructions and data in the cache. Based on an assumption that a program will sequence through successive instructions or data addresses, a block or line of several words from the main memory is transferred to the cache even though only one word is needed. When the processor needs to read from main memory the cache is checked first. If the data is in the cache, there is a hit and retrieval from cache. If the data is not in the cache, there is a miss and retrieval is from main memory.

Figure 2A:
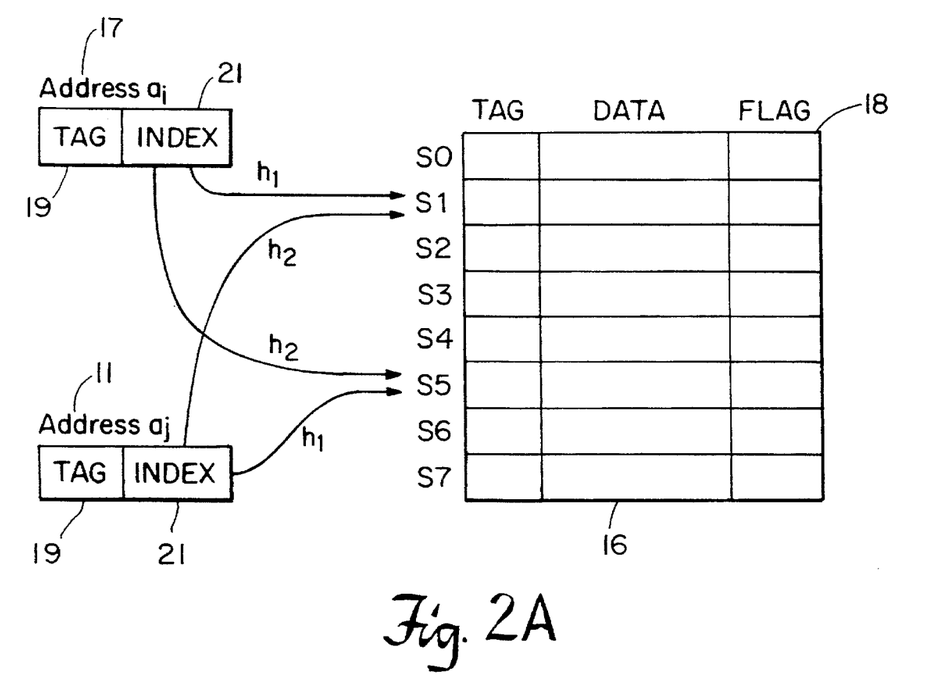
FIG. 2A illustrates a column associative cache with rehash blocks.

To provide a cache memory system with a high hit rate and a low access time, the present invention has set forth a cache that incorporates the characteristics of a direct-mapped cache and a d-way set associative cache. The cache of the present invention is a column associative cache 16 and is shown in FIG. 2A. The column associative cache contains a plurality of cache lines that represent a column of sets each of one line. In FIG. 2A, eight sets, S0–S7 of the cache are shown. It is noted that the column associative cache would likely have hundreds or thousands of sets.

To access the cache 16, a memory address 17 is divided into at least two fields, a tag field 19 (typically the high-order bits) and an index field 21. As in a conventional direct mapped cache, the index field is used through a hash function $h_1$ to reference one of the cache sets S0–S7 and the tag field is compared to the tag of the data within that set. A tag memory is coupled to the plurality of cache sets for storing the tags of the data blocks. If the tag field of the address matches the tag field of the referenced set, then there is a hit and the data can be obtained from the block that exhibited the hit. If the tag field of the address does not match the tag field of the referenced set, there is a miss.

Data addresses are indexed from the main memory 14 to the column associative cache 16 according to two hashing functions, $h_1$ and $h_2$, which are applied by controller 15. The hashing functions are operations that map the data addresses from the main memory to the cache sets based on spatial and temporal locality. Spatial locality suggests that future addresses are likely to be near the locations of current addresses. Temporal locality indicates that future addresses are more likely to reference the most recently accessed locations again.

The first hashing function, $h_1$, is preferably a bit selection operation. In a bit selection operation, data is indexed to the sets of the column associative cache according to its index field. Since some data may contain the same index field, there is high probability that there will be conflict miss between the data. The column associative cache of the present invention resolves the conflict by then applying a second hashing function, $h_2$. The second hashing function dynamically chooses a different location in which the conflicting data can reside. The second hashing function, $h_2$, is preferably a bit flipping operation that flips the highest ordered bit of the referenced by the index address and accesses the conflicting data at the set indexed by the inverted address. As shown in FIG. 2A, the first hashing function, $h_1$, indexes address $a_i$ 17 to set S1. Address 11 then attempts to access S1 but there is a miss because address 17 is already there. To resolve the conflict, the second hashing, $h_2$, function is applied to address 11. This hashing function flips the highest ordered bit of the index field so that address 11 can be indexed to S5. Thus, S1 and S5 share locations through $h_1$ and $h_2$ so that conflicts are resolved not within a set but within the column of sets of the entire cache.

Figure 2B:
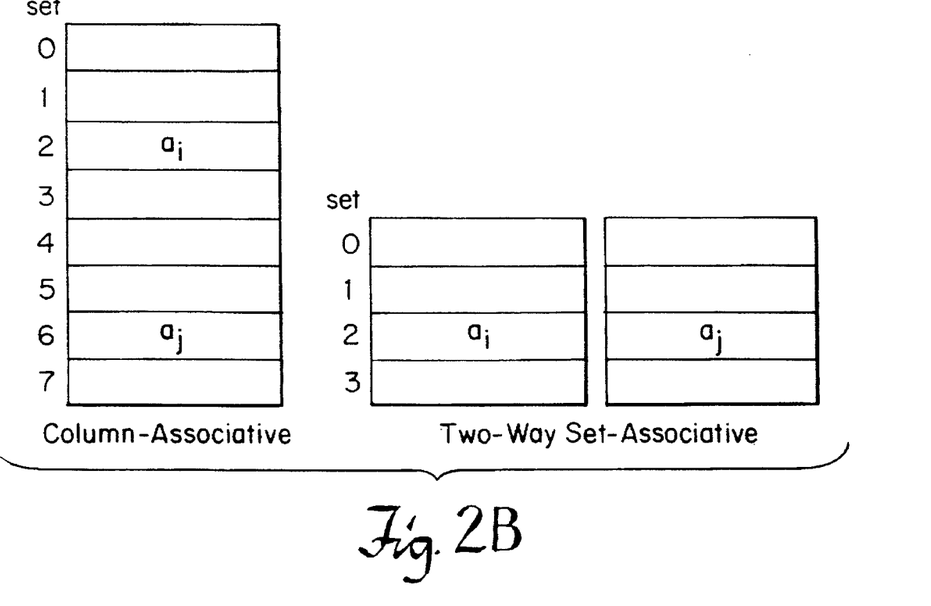
FIG. 2B illustrates a comparison of a column associated cache and two-way set associative cache.

A comparison of a column associative cache with a conventional two way set associative cache is illustrated in FIG. 2B. In the conventional cache, a set, such as set 2, stores two lines of data. Thus, if the requested data is stored in either line of a set, there is a hit. Drawbacks of such a cache are the high hit access time and hardware complexity. The column associate cache performs as a direct mapped cache unless there is a miss. With a miss it accesses another location within the same memory column. Thus, two sets share two locations.

Also, shown in FIG. 2A is a rehash block 18 coupled to each cache set for indicating whether the set has been rehashed. A rehashed location is a set that has already been indexed through the second hashing function to store data. The purpose of the rehash block is to indicate whether a location stores data through a rehashed index so the data should be replaced in preference for a non-rehashed index. Temporal locality suggests that rehashed locations should be preferentially replaced.

Figure 3:
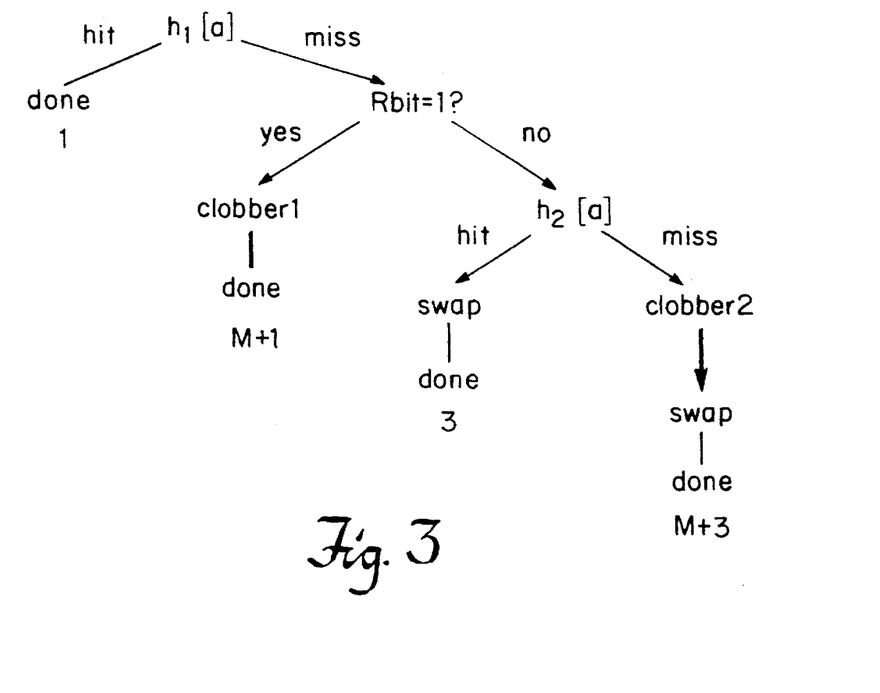
FIG. 3 shows a decision tree for the column associative cache with rehash blocks.

FIG. 3 discloses a controller decision tree for indexing the cache. Table 1 provides the decision tree mnemonics and cycle times for each cycle. First, the first hashing function, $h_1$, is applied to the memory address a. If the first-time access is a hit, then the data is accessed to the processor. However, if the first-time access is a miss, then the rehashed location block of that set is checked (Rbit=1?). If the rehash block has been set to one, then the data is removed from that cache set indexed by $h_1[a]$ and data from the main memory is retrieved and substituted therefor (Clobber 1). Next, the rehash block is reset to zero to indicate that the data in this set is to be indexed by the first hashing function $h_1$ for future indexes.

On the other hand, if the rehash block is set to zero, then upon a first-time miss, the second hashing function $h_2$ access is attempted. If the second hashing function indexes to valid data, then there is a second time hit. For a second time hit, the data is retrieved from that cache set and the data in the cache sets indexed by the first and second hashing functions, $h_1[a]$ and $h_2[a]$, are swapped (SWAP) so that the next access will likely result in a first time hit (temporal locality). However, if the second hashing function provides a second time miss, then the data in that set is replaced (Clobber2). Data from the main memory is retrieved and placed in the cache set indexed by the second hashing function, $h_2[a]$. Then the data in the cache sets indexed by the first and second hashing function, $h_1$ and $h_2$ are swapped with each other (SWAP).

TABLE 1

| Mnemonic | Action | Cycles |
| --- | --- | --- |
| $h_1[a]$ | bit-selection access | 1 |
| $h_2[a]$ | bit-flipping access | 1 |
| swap | swap data in sets accessed by $h_1[a]$ and $h_2[a]$ | 2 |
| clobber1 | get data from memory, place in set accessed by $h_1[a]$ | M |
| clobber2 | get data from memory, place in set accessed by $h_2[a]$ | M |
| Rbit=1? | check if set accessed by $h_1[a]$ is a rehashed location | 0 |
| inCAM? | check if a (or its index) matches a CAM entry | 0 |
| putinCAM | place a (or its index) in the CAM | 1 |
| putinCAM* | place the index of a and the tag present in the cache location accessed with $h_1[a]$ into the CAM | 1 |

At startup, all of the empty cache sets have their rehash blocks set to one so that compulsory misses are handled immediately.

The rehash block 18 increases the hit rate and decreases the access time for the column associative cache. The increase in performance is due to the fact that the data in the non-rehashed location are the most recent accessed data and, according to temporal locality, this data is more likely to be needed again. The removal of older data which will probably not be referenced again whenever a conflict miss occurs reduces the amount of clobbering. In addition, the ability to immediately replace a rehashed location on the first access reduces the number of cycles consumed by rehash accesses.

Figure 4:
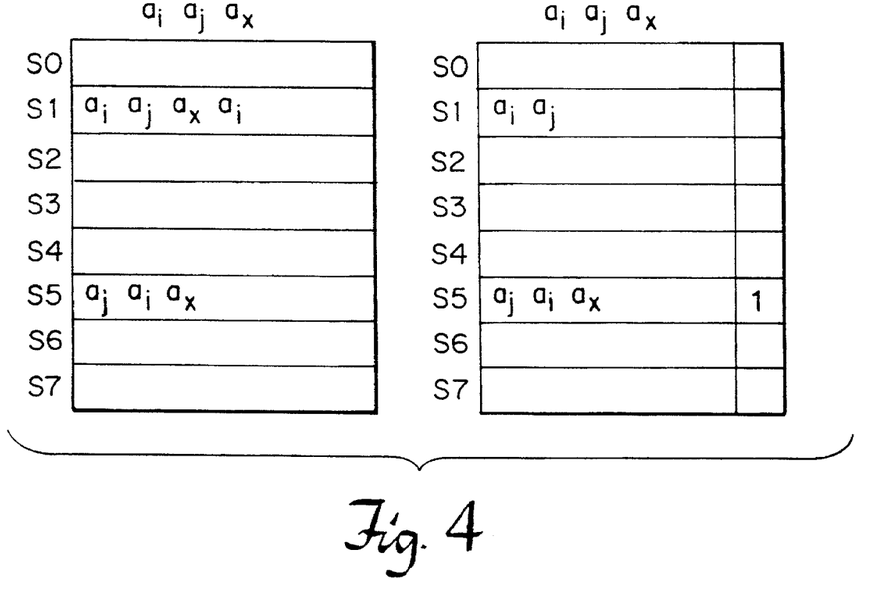
FIG. 4 shows a comparison between a single column associative cache and the column associative cache with rehash blocks.

In addition to limiting rehash accesses and clobbering, the column-associative cache with rehash block corrects a problem associated with indexing a reference pattern $a_i$ $a_j$ $a_x$ $a_j$ $a_x$ $a_j$ $a_x$ . . . where the addresses $a_i$ and $a_j$ map into the same cache location with bit selection, $h_1$, and $a_x$ is an address which maps into the same location with bit flipping, $h_2$. FIG. 4 shows how a single column associative cache and a column associative cache with a rehash block will index the above reference pattern. The figure shows at each location, the data stored in that location after the data request indicated by the input sequence. In the column associative cache, address $a_i$ is shown indexed into set S1 by the first hashing function, $h_1$. Address $a_j$ attempts to index S1 by the first hashing function, but there is a miss because address i is there. Then using the second hashing function, $h_2$, address $a_j$ is indexed to S5 and with a miss that data is retrieved and stored in S5. The data in S1 and S5 is then swapped. Thus, j is now in S1 and i is now in S5. The next address, $a_x$, attempts to access S5 but will miss because i is there. Then the second hashing function is applied to $a_x$ and it attempts to access S1, but there is a miss because j is there. Since this is a second time miss, the address $a_j$ is removed from S1 and replaced by $a_x$. Then $a_x$ and $ai_j$ are swapped so that i is in S1 and x is in S5. This pattern continues as long as $a_j$ and $a_x$ alternate. Thus, the data referenced by one of $a_j$ and $a_x$ is clobbered as the data i is swapped back and forth but never replaced.

This detrimental effect is known as thrashing, but as shown in FIG. 4, it does not occur in a column-associative cache with a rehash block. In the column associative cache with a rehash block, $a_j$ is indexed to S1 by the first hashing function $h_1$. Address $a_j$ attempts to index S1 but misses because i is there. Since there is a miss, the rehash block for S1 is checked to see if that set has been already indexed by the second hashing function $h_2$. Since S1 has not been indexed by $h_2$, its rehash block is 0. Then, the second hashing function indexes $a_j$ to S5 and the rehash block is set to 1. Then the data in S1 and S5 are swapped so that j is now in S1 and i is now in S5. Address $a_x$ attempts to access S5 but misses because i is there. However, because the rehash block of S5 is set to 1, j is removed and replaced by x. Thus S1 contains j and S5 contains x, eliminating the thrashing of j. Of course, this column-associative cache suffers thrashing if three or more conflicting addresses alternate, as in $a_i$ $a_j$ $a_x$ $a_i$ $a_j$ $a_x$ $a_i$ . . . , but this case is much less probable than in the case of two alternating addresses. Thus, the rehash block alleviates thrashing, reduces the number of rehash accesses and nearly eliminates clobbering.

Figure 5:
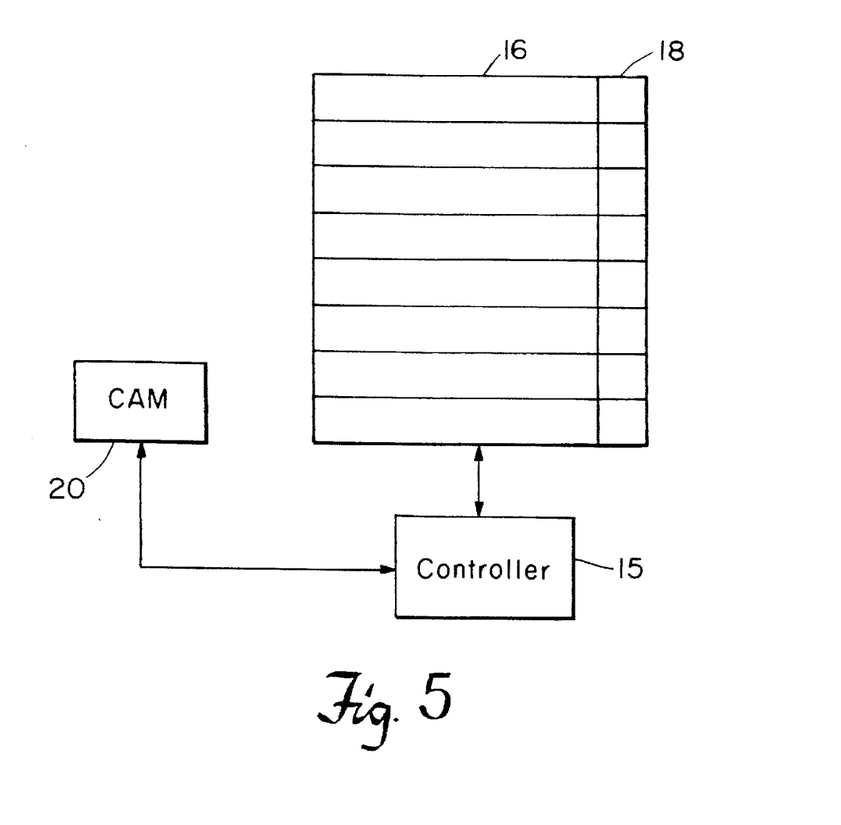
FIG. 5 shows a column associative cache with a content addressable memory (CAM) and rehash blocks.

To further reduce the access time of the column associative cache, a content addressable memory (CAM) 20 is added thereto. The purpose of the CAM is to reduce the number of unnecessary rehash accesses and swaps in the column associative cache. FIG. 5 shows the CAM 20 coupled to the column associative cache 16. The CAM stores addresses that potentially cause conflict misses, such as addresses that have been swapped with the rehashed location in a second-time hit. If the address in the CAM matches requested data address, then the controller attempts to index the referenced data using another hashing function, such as $h_2$, as the first hash.

Figure 6:
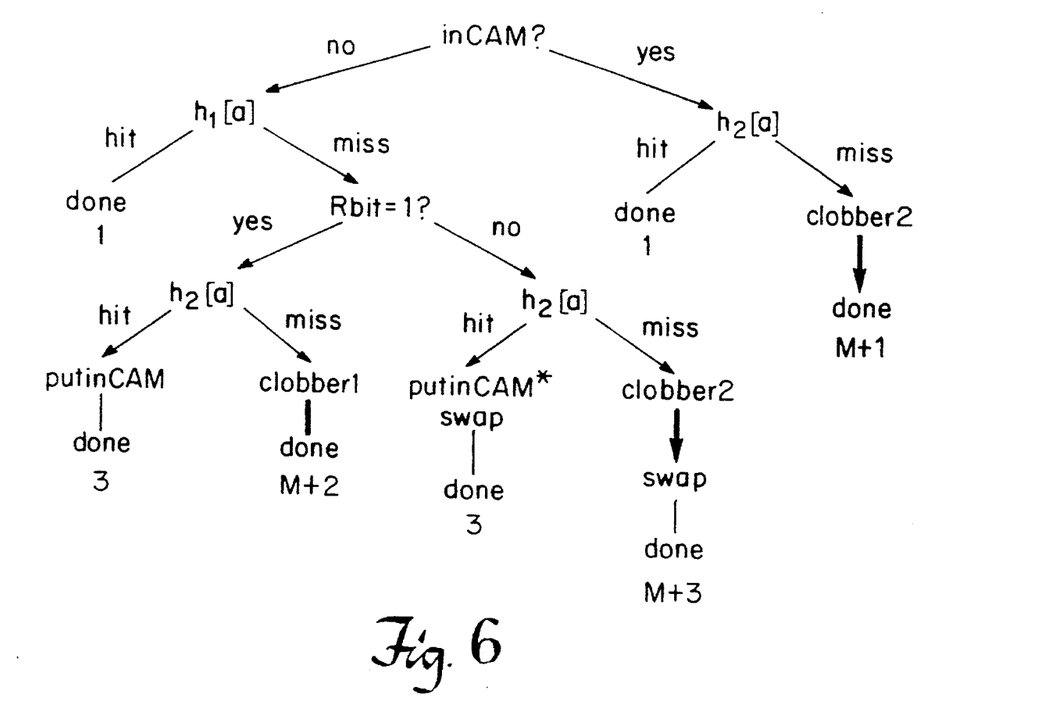
FIG. 6 shows a decision tree for a column associative cache with rehash blocks and a CAM.

FIG. 6 shows a decision tree for indexing an address a to the column associative cache with the CAM. Table 1 provides the decision tree mnemonics and cycle times for each cycle. First, the CAM is checked to determine whether the index of a matches the address entry within the CAM (inCAM?). If there is a match, then $h_2$ is used to index a. If $h_2[a]$ indexes valid data, then there is a hit and the data is retrieved. However, if there is a miss, then the data is clobbered and data from the main memory is retrieved and placed in the cache set accessed by $h_2$ (Clobber2).

On the other hand, if there is no match in the CAM, then $h_1$ is applied to a for indexing. If $h_1[a]$ indexes valid data, then there is a hit. However, if there is a miss, the rehash block is checked to determine whether the cache set accessed by $h_1[a]$ is a rehashed location (Rbit=1?). If the cache set is a rehashed location (=1), then $h_2$ is applied to a. A hit results in a or its index being retrieved and placed in the CAM (putinCAM) as a potential conflict. A miss causes the data in the set indexed by $h_1[a]$ to be clobbered and replaced with data retrieved from the main memory (Clobber 1). If the rehash block is not set to 1, then $h_2$ is applied to a for indexing. A hit results in an address from the index of $h_2[a]$ being placed into the CAM (putinCAM*). The address is reconstructed from the index of a and the tag at $h_1[a]$. Then data in cache sets accessed by $h_1[a]$ and $h_2[a]$ are swapped with each other. A miss causes the data to be clobbered and replaced with data retrieved from the main memory and placed in the set indexed by $h_2[a]$ (Clobber2) Then data in cache sets accessed by $h_1[a]$ and $h_2[a]$ are swapped with each other (SWAP).

An example of how the CAM provides better performance to the column associative cache is evident for the following reference pattern: $a_i$, $a_j$, $a_i$, $a_j$ . . . . To access the above reference pattern, the column associative cache 18 wastes many cycles swapping $a_i$ and $a_j$, repeatedly whereas the CAM 20 stores the address that referenced the data into the rehashed location on a second-time hit. For instance, the third reference, i, results in a second-time hit because the data j is indexed into the rehashed location as expected, but its address (i.e., tag and index) is stored in the CAM. The CAM is then checked in parallel with every first-time access, and if a match is found, the control logic will find the data directly by rehashing instead. The benefit of adding a CAM to the column-associative cache is that a swap is no longer necessary between the conflicting data because the CAM quickly points out those addresses which provide second-time hits. Thus, in the above example, $a_i$ remains in the non-rehashed location and is accessed in one cycle by $h_1[a_i]$. The conflicting data $a_j$ remains in the rehashed location and is accessed by $h_2[a_j]$ after $a_j$ is matched with its entry in the CAM.

An important feature of this design is that the search of the CAM does not impose a one cycle penalty. This feature is accomplished by optimizing the CAM so that a search is completed quickly enough to precede the first-time access in the cycle. This feature can also be implemented by performing the CAM access in a previous pipeline stage. However accomplished, eliminating the penalty of searching the CAM is crucial because a significant reduction in execution time is possible only if most of the data in rehashed locations can be retrieved as quickly as those in non-rehashed location.

Another benefit in using a CAM is evident in a first-time rehash $h_2[a]$ (due to a being in the CAM) that misses. The decision tree shows that in this case, no swap is needed because data is retrieved from the main memory and left in the set indexed by $h_2[a]$. This is done because that address is in the CAM due to a first-time rehash. Therefore, leaving the data in the rehashed location leads to future first-time rehash hits in only one cycle.

One of the drawbacks of using a CAM with a column associative cache is evident in situations when a set accessed by $h_1[a]$ is found to be a rehashed location. Instead of immediately replacing this data, a rehash access must be performed to ensure that the desired data is not located in the rehashed location. This is impossible for the single column-associative cache with rehash block, however, it is feasible when a CAM is included. For example, suppose an address exists in the CAM which causes a first-time rehash hit at $h_2[a]$. The CAM is a finite resource, so this address may be removed from the CAM after it becomes full. Now, if this address appears again in the reference stream, there is no CAM match, so a normal access is attempted when the data is in the set indexed by $h_2[a]$. Thus, replacing the non-rehashed location immediately would result in data being stored in two separate locations. The extra attempted rehash guards against this wasteful situation, but it adds a one cycle penalty.

Figure 7:
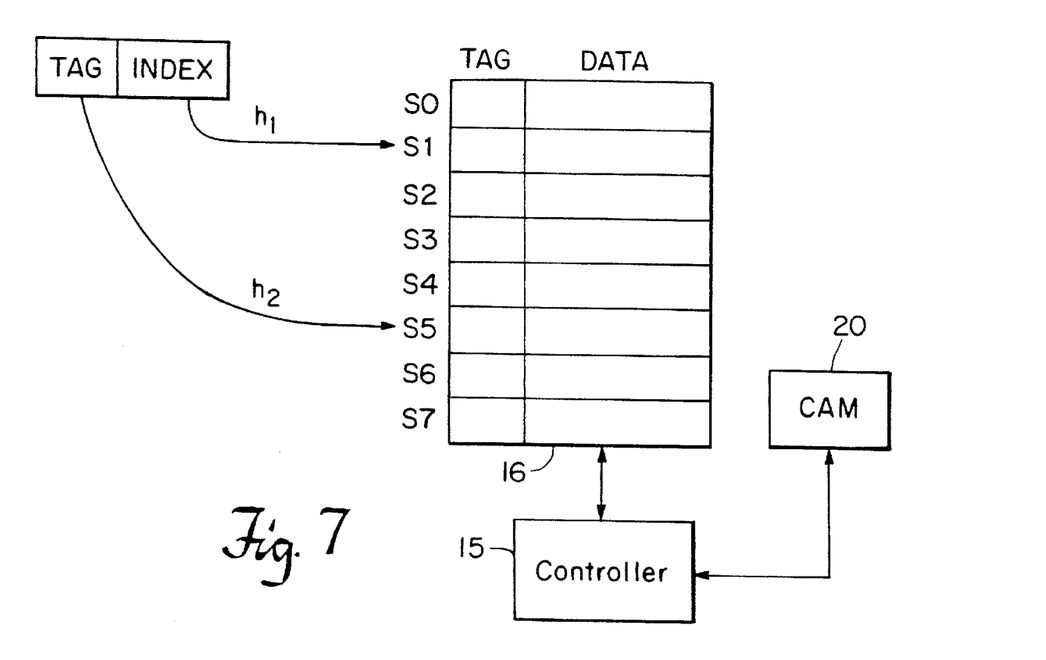
FIG. 7 shows a column associative cache with a CAM.

Another embodiment of the present invention is to have the CAM coupled to the column associative cache without having a rehash block (see FIG. 7). As in the above embodiment, the CAM 20 improves the efficiency of the column associative cache by storing portions of addresses that are expected to indicate future conflict misses. This reduces the number of unnecessary rehash accesses and swaps in the column associative cache. For example, after first time misses, a rehash access is only attempted when the control logic identifies this miss as a conflict. A conflict is identified by finding a match in the CAM. This conflict may be resolved by rehashing. Thus, fewer rehashes are attempted which improves the second time hit rate and decreases the extent of data being clobbered.

Figures 8, 9:
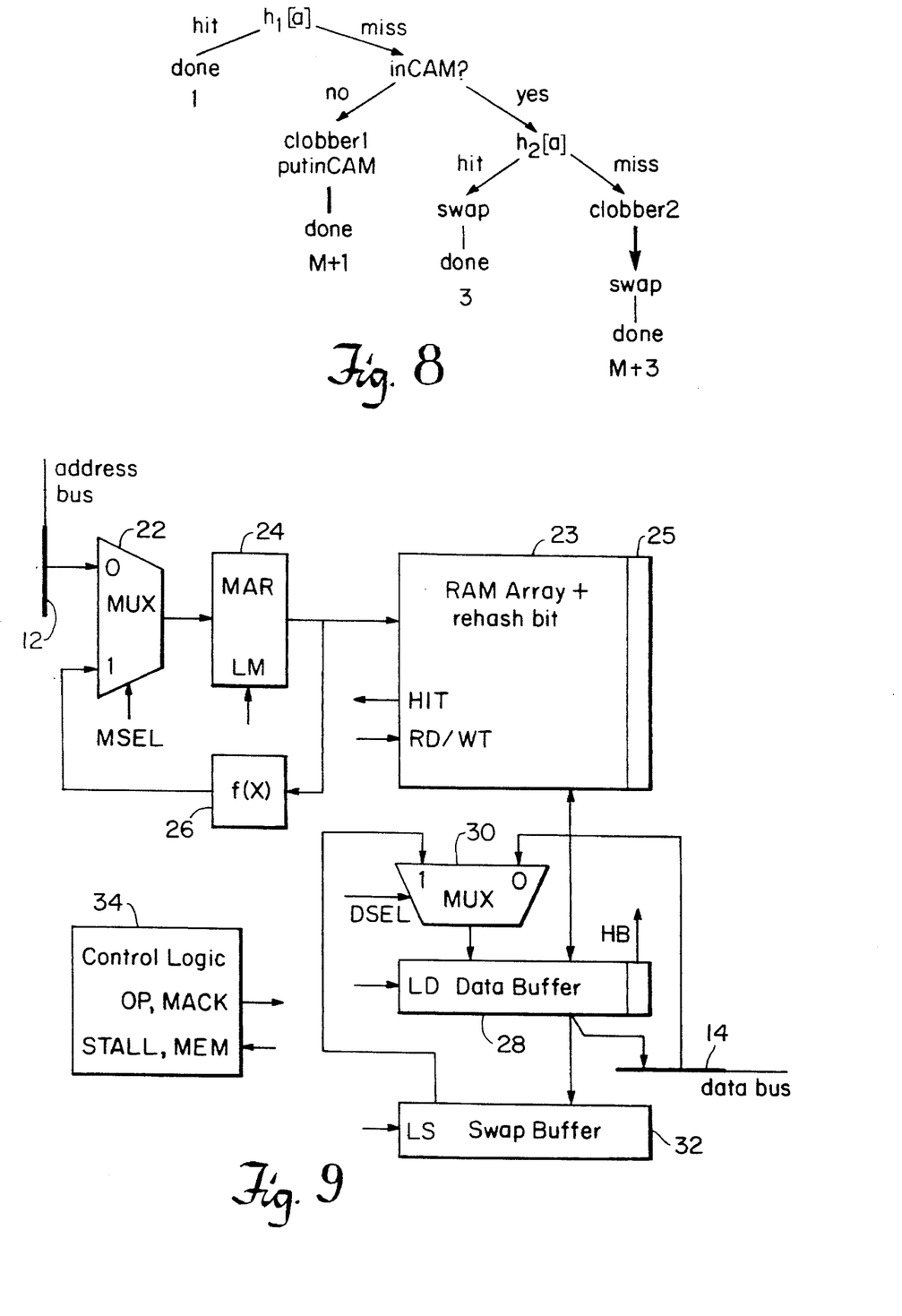
FIG. 8 shows a decision tree for a column associative cache with a CAM.
FIG. 9 shows the circuitry for a column associative cache with rehash blocks.

FIG. 8 discloses a controller decision tree for indexing an address to the column associative cache with CAM. Table 1 provides the decision tree mnemonics and cycle times for each cycle. First, the first hashing function, $h_1$, is applied to a memory address a. If the first time access is a hit, then the data is accessed. However, if the first time access is a miss, the CAM is checked to see if address a matches a CAM entry (inCAM?).

If address a does not match a CAM entry, the data in address a is removed (clobber1) and data is retrieved from the main memory and placed in the cache set accessed by the first hashing function $h_1[a]$. Then the data from address a is placed in the CAM (putinCAM).

However, if there is a match in the CAM, then the second hashing function $h_2[a]$ is applied. A hit causes the data to be accessed and then the data in the cache sets accessed by $h_1[a]$ and $h_2[a]$ are swapped (SWAP). A miss causes that the data to be removed from the cache set and replaced by data from main memory (clobber2). Then the data in the cache sets accessed by $h_1[a]$ and $h_2[a]$ are swapped (SWAP).

Figure 10:
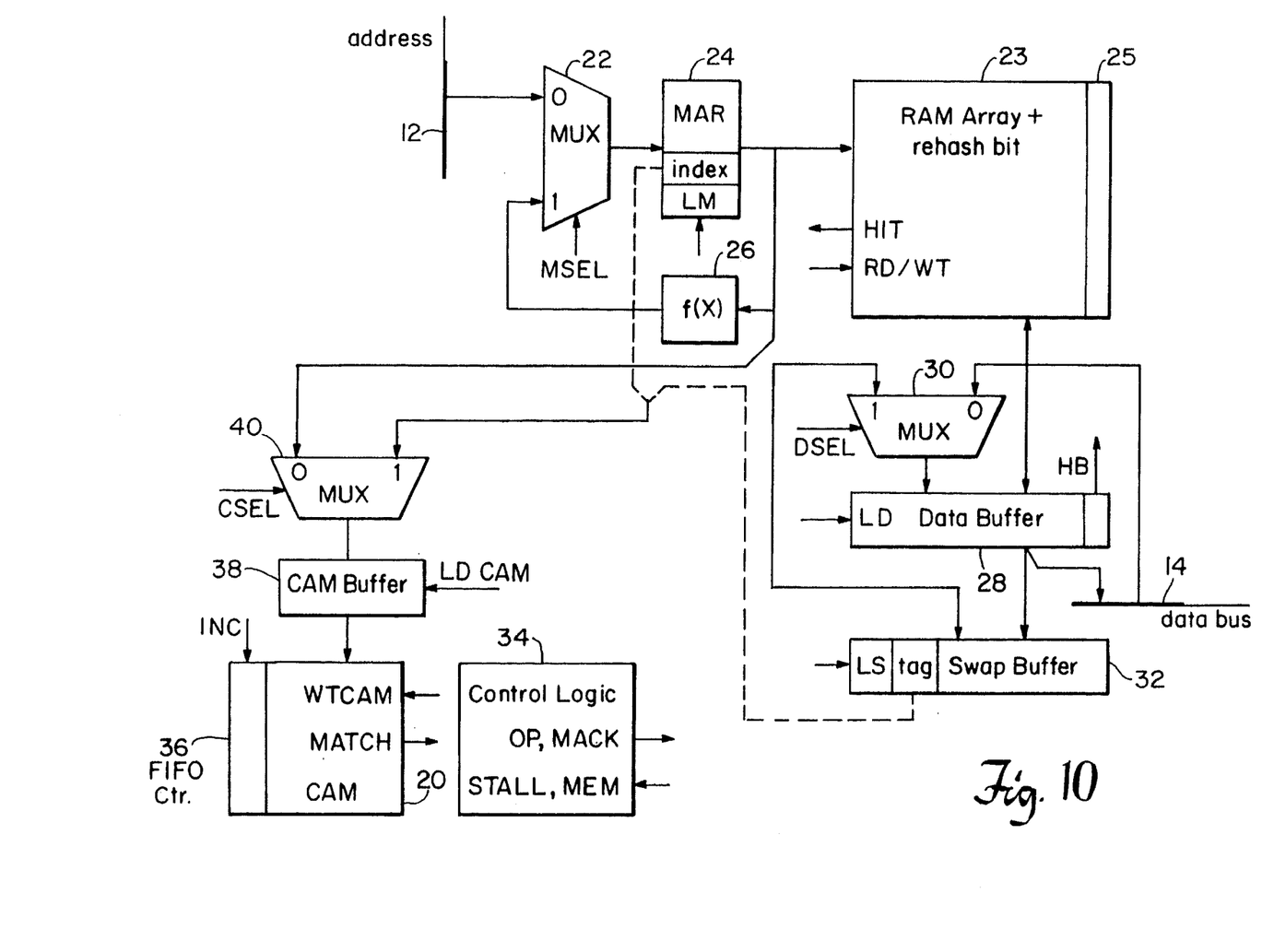
FIG. 10 shows the circuitry for a column associative cache with rehash blocks and a CAM.
Figure 11:
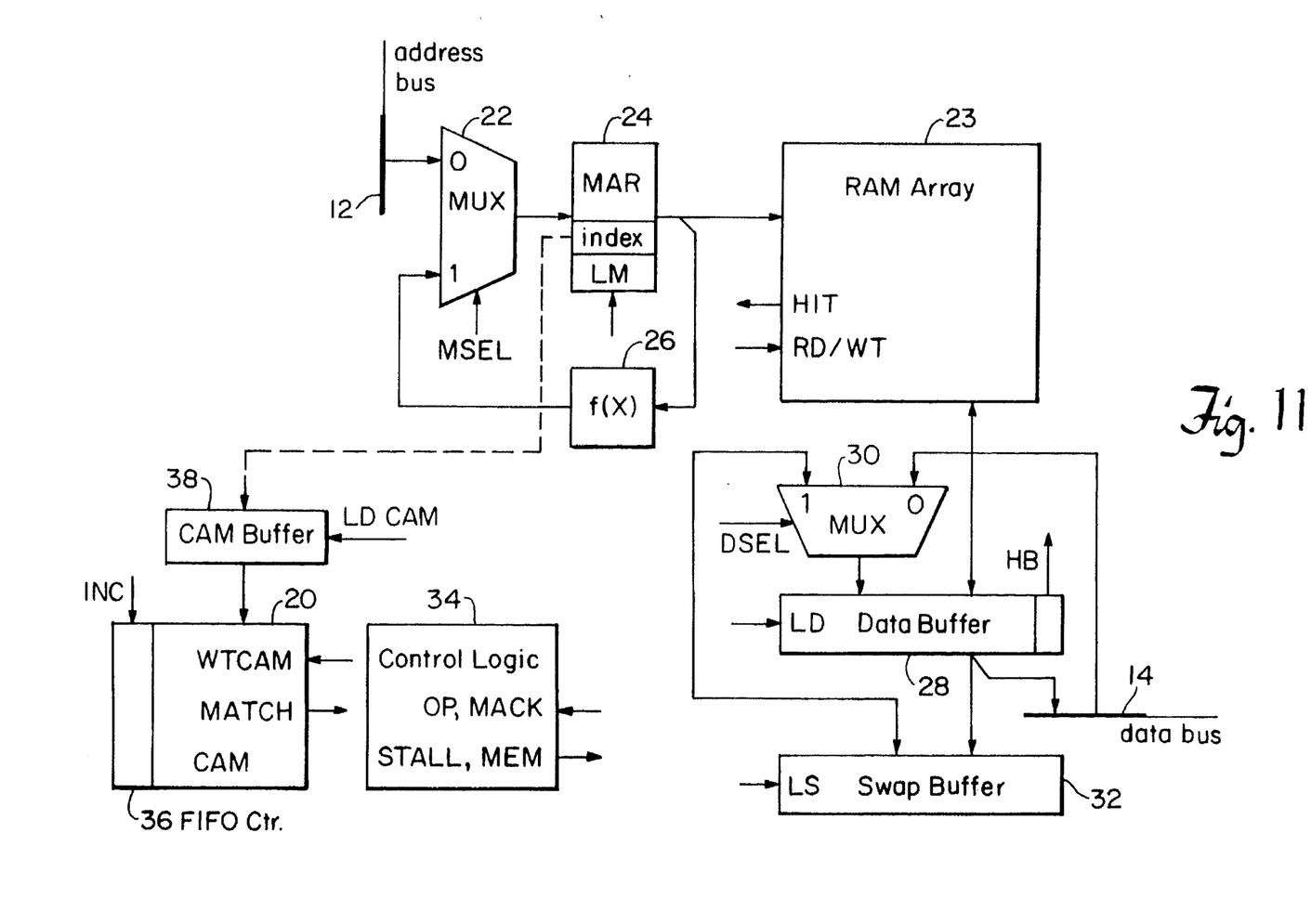
FIG. 11 shows the circuitry for a column associative cache with a CAM.

For a general understanding of how to implement the column associative cache with rehash block, the column associative cache with the rehash block and CAM, and the single column associative cache with CAM, reference is made to FIGS. 9–11 and Tables 2–4. The cache implementation for both FIGS. 9–11 are discussed at the register transfer level without the disclosure of the detailed gate and transistor designs since the actual control logic can be easily synthesized from the state flow tables set forth in Tables 2–4.

Furthermore, in order to provide brief yet descriptive details about the various embodiments, several simplifications and assumptions have been made. For example, a discussion regarding the clocking and timing issues is left out. Instead, it is assumed that the controller 15 receives input signals at the start of a cycle and issues output signals at the end of the cycle. Also, for simplicity, the bus interface and driver circuits have been left out.

FIG. 9 shows a hardware implementation of the column associative cache with rehash block for the present invention. The primary element of the column associative cache memory system is a RAM array 23 having a rehash block 25. The RAM, preferably a tag memory, has a plurality of cache sets to store memory addresses. The processor sends a data address via an n-bit multiplexor 22 to a memory address register (MAR) 24. Connected in between the output of the MAR and one of the inputs of the multiplexor 22 is an inverter 26. The multiplexor 22, the MAR 24, and the inverter 26 interact to index the data address from the processor to the RAM. More specifically, the multiplexor and the inverter apply the first hashing function $h_1$ and the second hashing function $h_2$ to the data address.

The RAM 23 communicates with the data bus via a data buffer 28. In between the data buffer and the RAM is a second n-bit multiplexor 30. A swap buffer 32 communicates with both the multiplexor 30 and the data buffer 28 so that current data can be placed in the cache set most likely to be accessed.

The controller 15 provides the necessary control logic to each of the above components so that the algorithm of the decision tree in FIG. 3 is followed. The control signals for FIG. 9 are summarized in Table 2 as well as the actions taken for a given state, input, output, and next state. A discussion of the components and Table 2 is set forth below and can be followed in FIG. 3.

TABLE 2

| State | Input | Output | Next state |
|-------|-------|--------|------------|
| IDLE | OP | LM,RD | b[a] |
| b[a] | HIT | | IDLE |
| | !HIT,!HB | STALL,MSEL,LM,RD,LS | f1[a] |
| | !HIT,HB | MEM,STALL | XWAIT |
| f1[a] | HIT | MSEL,LM,WT | f2[a] |
| | !HIT | MEM | WAIT1 |
| f2[a] | | DSEL,LD | f3[a] |
| f3[a] | | MSEL,LM,WT | IDLE |
| WAIT1 | MACK | MSEL,LM,WT | WAIT2 |
| WAIT2 | | DSEL,LD | WAIT3 |
| WAIT3 | | MSEL,LM,WT | IDLE |
| XWAIT | MACK | LD,WT | IDLE |

Upon receiving an opcode signal (OP), the controller loads (LM) the MAR with an memory address a from the address bus. Then the controller issues a read or write signal (RD/WT) to the RAM so that the first hashing function $h_1$ is be applied to address a. If the RAM returns a hit signal (HIT), then the data is automatically loaded (LD) into the data buffer 32 to be retrieved and the controller goes to an IDLE state.

If the $h_1[a]$ access misses (! HIT) and the rehash block has not been rehashed (!HB), then the controller stalls the processor (STALL), copies (LS) the data from the $h_1[a]$ access into the swap buffer, loads the MAR with the second hashing function $h_2$ (MSEL and LM), issues a read (RD) signal to the RAM and moves to the f1[a] state. If the access misses (!HIT) and the rehash block is set to one (HB), then the data is removed and the controller makes a request to the main memory (MEM), stalls the processor (STALL), and moves to the XWAIT state.

In the f1[a] state, a hit causes the controller to load the MAR with that index (MSEL, LM), issue a write signal (WT) to the RAM and move to the f2[a] state. For a miss (!HIT), the controller makes a request to the main memory (MEM) to retrieve data and moves to the WAIT1 state.

In the f2[a] state, the controller swaps the data in the data buffer and the swap buffer (DSEL, LD) and moves to the f3[a] state.

In the f3[a] state, the controller loads the MAR (MSEL, LM), issues a write (WT) signal to the RAM, and moves to the IDLE state.

In the WAIT1 state, the memory acknowledges completion (MACK), the data is taken from the data bus and loaded in the MAR (MSEL, LM), a write signal is issued to the RAM (WT), and the controller moves to the WAIT2 state.

In the WAIT2 state, the controller swaps the data in the data buffer (DSEL, LD) and moves to the WAIT3 state.

In the WAIT3 state, the controller loads (MSEL, LM) the MAR, issues a write signal (WT) to the RAM and moves to the IDLE state.

In the XWAIT state, the controller receives a signal that the access is complete (MACK), loads the data into the data buffer (LD), issues a write command (WT), and moves to the IDLE state.

The circuitry of the column associative cache with CAM and rehash block is more complex than the cache by itself (see FIG. 10). For example, there is a CAM 20, a first in first out (FIFO) counter 36, a CAM buffer 38, and another n-bit multiplexor 40. The FIFO counter points to the next location in the CAM that is to be replaced and the CAM buffer holds indexes while they are being compared or before they are written into the CAM. Even though this hardware consumes a great deal of area, the critical access path of the column associative cache is not affected. Besides the above additions, the MAR 24 and the swap buffer 32 are shown to have capability for storing partial addresses such as the index and tag fields, respectively.

The state flow table in Table 3 reveals that the control logic for the column associate cache with the CAM and rehash block is more complex. For example, the variables for each state have changed and are referenced differently than the column associative cache. Furthermore, upon receiving an opcode (OP), the controller searches the CAM to determine if there is a match for the address a. If there is no initial match (! MATCH) in the CAM, the controller loads the MAR (LM), issues a read signal (RD) to the RAM, and moves to the b[a] state. A match (MATCH) in the CAM enables the controller to load the MAR (MSEL, LM), issues a read signal (RD) to the RAM; and moves to the ff[a] state.

A hit (HIT) in the ff[a] state enables the controller to place the index field of the data within the MAR into the CAM buffer (LDCAM) and then move to the IDLE state. On the other hand, a miss (! HIT) enables the controller to stall the processor (STALL), make a request to the main memory (MEM), and then move to the WAIT state.

A hit (HIT) in state b[a] causes the controller to place the index field of the data within the MAR into the CAM buffer 38 (LDCAM) and moves to the IDLE state. A miss (!HIT) with a zero rehash block (! HB) or a one rehash block (HB) causes the controller to stall the processor (STALL), load the MAR (MSEL, LM), issue a read signal (RD) to the RAM, load the swap buffer (LS) with the data from b[a] and move to the f1[a] and fc[a] state, respectively.

TABLE 3

| State | Input | Output | Next State |
|---|---|---|---|
| IDLE | OP,!MATCH | LM,RD | b[a] |
|  | OP,MATCH | MSEL,LM,RD | ff[a] |
| ff[a] | HIT | LDCAM | IDLE |
|  | !HIT | STALL,MEM | WAIT |
| b[a] | HIT | LDCAM | IDLE |
|  | !HIT,!HB | STALL,MSEL,LM,RD,LS | f1[a] |
|  | !HIT,HB | STALL,MSEL,LM,RD,LS | fc[a] |
| f1[a] | HIT | MSEL,LM,WT,CSEL, LDCAM,WTCAM | f2[a] |
|  | !HIT | MEM | WAIT1 |
| f2[a] |  | DSEL,LD,INC | f3[a] |
| f3[a] |  | MSEL,LM,WT,LDCAM | IDLE |
| fc[a] | HIT | LDCAM,WTCAM | fc2[a] |
|  | !HIT | MEM | WAIT |
| fc2[a] |  | INC,LDCAM | IDLE |
| WAIT | MACK | LD,WT,LDCAM | IDLE |
| WAIT1 | MACK | MSEL,LM,WT | WAIT2 |
| WAIT2 |  | DSEL,LD | WAIT3 |
| WAIT3 |  | MSEL,LM,WT,LDCAM | IDLE |

A hit in the f1[a] causes the controller to load the MAR (MSEL, LM), issue a write signal (WT) to the RAM, place the address from the MAR in the CAM (CSEL, LDCAM, WTCAM), and move to the f2[a] state. A miss (!HIT) causes the controller to make a request to the memory (MEM) and go to the WAIT1 state.

In the f2[a] state, the controller points to the next location in the CAM (INC), swaps the data in the data buffer with the data in the swap buffer (DSEL, LD), and moves to the f3[a] state.

In the f3[a] state, the controller places an index within the MAR and the CAM buffer (MSEL, LM, WT, LDCAM) and moves to the IDLE state.

In the fc[a] state, the data is indexed. A hit (HIT) causes the controller to place the index within the MAR into the CAM buffer (LDCAM), place the current index into the CAM (WTCAM), and move to the fc2[a] state. A miss (!HIT) causes the controller to make a request to the memory to retrieve data (MEM), and move to the WAIT state.

In the fc2[a] state, the controller issues an INC command to the FIFO counter in order to point to the next location in the CAM, places an index within the MAR into the CAM buffer (LDCAM), and moves to the IDLE state.

In the WAIT state, the controller receives a signal indicating that the access is complete (MACK), loads the MAR with the next access (LD), issues a write signal to the RAM (WT), places an index within the MAR into the CAM buffer (LDCAM) and then moves to the IDLE state.

In the WAIT1 state, the controller receives a signal indicating that the access is complete (MACK), loads the MAR (MSEL, LM), issues a write signal (WT), and moves to the WAIT2 state.

In the WAIT2 state, the controller swaps data between the data buffer 28 and the swap buffer 32, loads the data buffer with the data (DSEL,LD), and moves to the WAIT3 state.

In the WAIT3 state, the controller loads the MAR (MSEL, LM), issues a write signal to the RAM (WT), places the index within the MAR into the CAM buffer (LDCAM), and moves to the IDLE state.

Note that all states whose next state is IDLE assert the LDCAM line. This serves as a reminder that in order for the CAM search and the setting of MATCH to precede the first-time cache access, the search must be either extremely fast or part of a previous pipeline stage. LDCAM is listed as an output of the stages executed before the IDLE state as a reminder of these potential solutions. In these cases, actually, the CAM buffer would need to find the next address on the address bus, because the MAR has not yet latched the next reference. Also, note that the state flow Table 3 proceeds similarly to the state flow Table 2 for first-time hits and first-time misses when the rehash block is zero. The only exception is for a second-time hit, when the original non-rehashed address must be placed in the CAM in addition to the swap. This is accomplished by asserting CSEL, LDCAM and WTCAM during state f1[a]. Also, INC is asserted during f2[a] to increment the FIFO counter, which points to the location of the next write to the CAM but does not affect the next CAM search.

The new entries in the state table involve the paths if an initial CAM match occurs or if a first-time miss reveals a rehashed location. If the MATCH line is asserted initially, then the controller moves to set ff[a] and attempts a standard rehash access. If successful, nothing remains to be done. If it misses, then this rehashed location is simply replaced by data from the memory during the WAIT state. Note that MSEL and LM are not to be used to change the MAR contents. Since the address that accesses this location is still in the CAM, a future reference will be successful in one cycle. In the case that a first-time miss reveals a rehashed location, state fc1[a] is entered and, unlike the column-associative cache with rehash block, a rehash is performed to assure that the data does not exist in the rehashed location. If this access does indeed hit, the address is simply placed in the CAM. Thus, a feature reference immediately finds a match in the CAM and completes a rehash access in one cycle. If there is a miss, then the algorithm proceeds as in the column-associative cache with rehash block and replaces the non-rehashed location.

The circuitry of the column associative cache with a CAM is shown in FIG. 11. The control signals for FIG. 11 are summarized in state flow Table 4. A discussion of the components and Table 4 are set forth below and correspond to the decision tree of FIG. 8.

TABLE 4

| state | input | output | next state |
|---|---|---|---|
| IDLE | OP | LM,RD,LDCAM | b[a] |
| b[a] | HIT | | IDLE |
| | !HIT,MATCH | STALL,MSEL,LM,RD,LS | f1[a] |
| | !HIT!MATCH | MSEL,STALL,WTCAM | XWAIT |
| f1[a] | HIT | MSEL,LM,WT,DSEL,LD | f2[a] |
| | !HIT | MEM | WAIT1 |
| f2[a] | | MSEL,LM,WT | IDLE |
| WAIT1 | MACK | MSEL,LM,WT,DSEL,LD | WAIT2 |
| WAIT2 | | MSEL,LM,WT | IDLE |
| XWAIT | MACK | INC,LD,WT | IDLE |

Upon receiving an opcode (OP), the controller loads the MAR (LM), issues a read signal (RD) to the RAM, places the index within the MAR into the CAM buffer (LDCAM) and moves to the b[a] state.

A hit in the b[a] state (HIT) causes the data to be accessed and then the controller moves to the IDLE state. A miss (!HIT) with a match (MATCH) in the CAM causes the controller to stall the processor (STALL), load the MAR (MSEL,LM), issue a read signal (RD) to the RAM, load the swap buffer (LS) with the data from $h_1[a]$ and move to the f1[a] state. A miss (!HIT) without a match (! MATCH) in the CAM causes the controller to make a request to memory (MEM), stall the processor (STALL), write into the CAM (WTCAM) and move to the XWAIT state.

A hit (HIT) in the f1[a] state causes the controller to load the MAR (MSEL,LM), write the RAM (WT), load the data buffer with the data (DSEL,LD) and move to the f2[a] state. A miss (!HIT) causes the controller to make a request to memory (MEM) and move to the WAIT1 state.

In the f2[a] state, the controller loads the MAR (MSEL, LM) and issues a write signal (WT), and moves to the IDLE state.

In the WAIT1 state, the controller receives an input signal indicating that the access is complete (MACK), then loads the MAR (MSEL, LM), issues a write signal (WT), swaps data between the data buffer and the swap buffer, loads the data buffer with the data (DSEL, LD), and moves to the WAIT2 state.

In the WAIT2 state, the controller loads the MAR (MSEL, LM), issues a write signal to the RAM (WT), and moves to the IDLE state.

In the XWAIT state the controller receives an input signal indicating that the access is complete (MACK), then the controller issues an INC command to the FIFO counter in order to point to the next location the CAM, places an index into the MAR (LD), writes the RAM (WT), and moves to the IDLE state.

An important parameter for the CAM disclosed in FIGS. 10 and 11 is its size parameter. Like the victim cache, the percentage of conflicts removed increases as its size increases, because there are more locations to store conflicting data removed from the cache. However, this improvement eventually saturates to a constant level, because there exists only so many conflicting data bits which need to reside therein at one time. However, the CAM can perform without saturation for up to 128 entries, whereas the victim cache can perform only up to 16 entries before saturation occurs.

The column associative cache with a CAM can use the full index field or omit some of the low order bits from the index fields that are to be placed in the CAM. For example, if two bits are trapped from the index, then four different addresses could cause a CAM match with the same entry. These addresses may be consecutive numbers, since the low order bits have been dropped. The use of partial index fields increase the number of rehashes attempted, because a reference is predicted to be a conflict if it indexes one of four consecutive locations. As seen previously, an increase in the number of rehashes attempted often decreases the second time hit rate and likely degrades performance. However, this modification may prove useful in applications where data or instructions are often known to be stored sequentially or in consecutive bits.

Also, note that the present invention is not limited to the two hashing functions, $h_1$ and $h_2$, bit selection operation and bit flipping operation. Other hashing functions may be used in addition to bit flipping in order to improve the randomness of accesses and to decrease the amount of clobbering.

While the invention has been particularly described in conjunction with a preferred embodiment thereof, it will be understood that many alternatives, modifications and variations will be apparent to those skilled in the art without departing from the spirit and scope of the invention as defined by the appended claims.

We claim:

1. A cache memory system comprising:

a cache memory having a plurality of cache locations, each for storing a cache line of data, separately accessed from a main memory, and having a first tag memory, each cache location being indexed by indexes, taken from memory addresses, through first and second hashing functions such that plural memory addresses having a common index access plural memory locations through the first and second hashing functions and different indexes access common memory locations through the first and second hashing functions;

hash control storage storing control data comprising hash data associated with each cache location which indicates the hashing function used to store data in the cache location; and a controller coupled to the cache memory responsive to memory addresses in accesses to the main memory for accessing data in the cache memory through the first and second hashing functions and for replacing data in the cache memory from the main memory responsive to the control data and to comparisons between tags of the memory addresses and tags stored in the first tag memory.

2. A cache memory system as claimed in claim 1 wherein the controller checks the hash data of the cache location indexed by the first hashing function when there is a miss at that cache location and applies the second hashing function only when said hash data indicates data stored in the cache location was not stored using the second hashing function.

3. A cache memory system as claimed in claim 1 wherein the controller responds to the hash data to determine whether to replace data stored in a first location indexed through the first cache hashing function or a second cache location indexed through the second hashing function.

4. A cache memory system as claimed in claim 3 wherein the controller swaps data replaced in a cache location with data in another cache location indexed by a common index.

5. A cache memory system as claimed in claim 1 further comprising a second tag memory coupled to the controller for storing as control data at least portions of memory addresses that indicate that data stored in a cache location is likely indexed through one of the hashing functions.

6. A cache memory system as claimed in claim 5 wherein the controller accesses cache memory locations through the first hashing function or the second hashing function dependent on whether at least a portion of a memory address is stored in the second tag memory and, where a miss results at a cache memory location with access through the first hashing function and the second hashing function, the controller replaces the data stored through the first hashing function if said hash data indicates the data accessed through the first hashing function had been stored using the second hashing function, or through the second hashing function if said hash data indicates the data accessed through the first hashing function had been stored using the first hashing function.

7. A cache memory system as claimed in claim 1 wherein the hash control storage comprises a second tag memory coupled to the controller for storing as control data at least portions of memory addresses that indicate a likely hashing function through which data stored in cache is indexed.

8. A cache memory system as claimed in claim 7 wherein the second tag memory is a content addressable memory.

9. A cache memory system comprising:
- a cache memory having a plurality of cache locations, each for storing a cache line of data, separately accessed from a main memory, and having a first tag memory, each cache location being indexed by indexes, taken from memory addresses, through first and second hashing functions such that plural memory addresses having a common index access plural memory locations through the first and second hashing functions and such that different indexes access common memory locations through the first and second hashing functions;
- hash data associated with each of the plurality of cache locations for indicating the hashing function used to store data therein; and
- a controller coupled to the cache memory for accessing data in the cache locations through the first and second hashing functions and for replacing data in the cache locations from main memory, the controller being responsive to the hash data and a comparison of tags of the memory address and stored tags in cache memory in determining whether to replace data in a first location accessed through the first hashing function or in a second location accessed through the second hashing function.

10. A cache memory system according to claim 9, wherein the first hashing function is a bit selection operation.

11. A cache memory system according to claim 9, wherein the controller checks the hash data of a cache location indexed by the first hashing function when there is a miss to determine whether to apply the second hashing function.

12. A cache memory system according to claim 9, wherein the second hashing function is a bit selection and flipping operation.

13. A cache memory system according to claim 9, wherein the controller removes the data from the cache location indexed by the second hashing function after a miss and retrieves new data from the main memory in place therefor.

14. A cache memory system according to claim 13, wherein the controller swaps the new data in the cache location indexed by the second hashing function with the data in the cache location indexed by the first hashing function.

15. A cache memory system according to claim 9, wherein the controller responds to a miss at a cache location through the first hashing function, and to hash data indicating data is stored at that cache location through the second hashing function, to remove data from that cache location and retrieve data from main memory in place therefor.

16. A cache memory system as claimed in claim 15 wherein the controller swaps data replaced in a cache location with data in another cache location indexed by a common index.

17. A cache memory system according to claim 9, further comprising a second tag memory coupled to the controller for storing at least portions of addresses that indicate that data stored in a cache location is likely to be indexed through the second hashing function, the controller using the second hashing function in the initial cache indexing where an address is found in the second tag memory.

18. A cache memory system comprising:
- a cache data memory having a plurality of cache locations for storing plural cache lines of data, each cache location being referenced by a memory address having an index field and a tag field, and each cache location being indexed by indexes, taken from memory addresses, through first and second hashing functions such that plural memory addresses having a common index access plural memory locations through the first and second hashing functions and such that different indexes access common memory locations through the first and second hashing functions;
- a first tag memory coupled to the cache data memory for storing the tag fields of the data stored in the plurality of cache locations;
- hash data coupled to the cache data memory for indicating hashing functions used to index data in the cache locations;
- a second tag memory coupled to the cache data memory for storing at least portions of memory addresses that indicate that data stored in a cache location is likely indexed through one of the hashing functions; and
- a controller responsive to the hash data, the first tag memory and the second tag memory for indexing memory addresses according to at least one of the plural hashing functions.

19. A cache memory system according to claim 18, wherein the controller applies first and second hashing functions to a memory address, the second hashing function being a bit selection and bit flipping operation.

20. A method for accessing data from a cache data memory, having a plurality of cache locations and a first tag memory, comprising the steps of:
- indexing a memory address having an index field and a tag field into an indexed cache location according to a hashing function;
- comparing a tag field of the memory address to a tag field in the first tag memory for the indexed cache location; and
- generating a hit when the tag field of the memory address matches the tag field of the indexed cache location, and generating a miss when the tag field of the memory address does not match the tag field of the indexed cache location, and in generating a miss, choosing between the step of indexing another cache location through another hashing function and the step of replacing data, the step of replacing data in the cache location being chosen if hash data indicates data located in the cache location was indexed through another hashing function.

21. A method according to claim 20, further comprising the steps of connecting a content addressable memory to the cache data memory for storing portions of memory addresses, each portion indicating that data stored in a cache location is likely indexed through one of plural hashing functions, and checking the content addressable memory for a match with a portion of the memory address.

22. A method as claimed in claim 20 further comprising swapping the replaced data in a cache location with data in another cache location indexed by a common index.

23. A method of accessing data from a cache data memory having a plurality of cache locations and first tag memory comprising the steps of:

indexing a memory address having an index field and a tag field into an indexed cache location according to a hashing function applied to the index field; and comparing a tag field of the memory address to a tag field in the first tag memory for the indexed cache location; and storing control data which identifies the hashing function used to store data in each cache location;

wherein data is accessed in the cache locations through first and second hashing functions and data is replaced in the cache locations from main memory responsive to the control data which is stored according to past cache operations and comparisons between tags of memory addresses and tags stored in the first tag memory.

24. A method as claimed in claim 23 further comprising determining from a second tag memory a hashing function through which data stored in a cache location is likely indexed and selects that hashing function for indexing the cache location.

25. A method as claimed in claim 23 further comprising swapping data in the cache location indexed by the second hashing function with the data in the cache location indexed by the first hashing function when replacing data.

\* \* \* \* \*

UNITED STATES PATENT AND TRADEMARK OFFICE
CERTIFICATE OF CORRECTION

PATENT NO. : 5,530,958
DATED : June 25, 1996
INVENTOR(S) : Anant Agarwal and Steven D. Pudar It is certified that error appears in the above-indentified patent and that said Letters Patent is hereby corrected as shown below:

At column 1, line 4, insert the following paragraph:

---GOVERNMENT SUPPORT

This invention was made with government support under Grant Number 9012773-MIP awarded by the National Science Foundation. The government has certain rights in the invention.---

Signed and Sealed this

Eighth Day of October, 1996

*Attest:*

BRUCE LEHMAN

*Attesting Officer*    Commissioner of Patents and Trademarks